US011097587B2

(12) United States Patent
Toyohira et al.

(10) Patent No.: US 11,097,587 B2
(45) Date of Patent: Aug. 24, 2021

(54) ELECTROMAGNETIC SUSPENSION APPARATUS

(71) Applicant: HONDA MOTOR CO., LTD., Tokyo (JP)

(72) Inventors: Tomoya Toyohira, Wako (JP); Takafumi Kato, Wako (JP); Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 16/426,178

(22) Filed: May 30, 2019

(65) Prior Publication Data
US 2019/0366791 A1 Dec. 5, 2019

(30) Foreign Application Priority Data
Jun. 1, 2018 (JP) .............................. JP2018-106302

(51) Int. Cl.
*B60G 17/018* (2006.01)
*B60G 17/06* (2006.01)

(52) U.S. Cl.
CPC ......... *B60G 17/0182* (2013.01); *B60G 17/06* (2013.01); *B60G 2202/42* (2013.01); *B60G 2500/10* (2013.01); *B60G 2600/73* (2013.01)

(58) Field of Classification Search
CPC ............ B60G 2500/10; B60G 17/0157; B60G 2400/252; B60G 2202/42; B60G 2800/916; B60W 10/22; B60W 2710/226
See application file for complete search history.

(56) References Cited

U.S. PATENT DOCUMENTS

| 7,962,261 B2 * | 6/2011 | Bushko | B60G 21/0555 701/37 |
| 2004/0150361 A1 * | 8/2004 | Hio | B60G 17/0165 318/375 |

(Continued)

FOREIGN PATENT DOCUMENTS

| JP | 2010-132222 A | 6/2010 |
| JP | 2010126044 A * | 6/2010 |

OTHER PUBLICATIONS

Xactly.com, Hookes Law, to Jeff Cruzan, available at: https://xaktly.com/HookesLaw.html#:~:text=Each%20spring%20has%20its%20own%20force%20constant.&text=The%20minus%20sign%20in%20F,it%20to%20its%20natural%20length (Year: 2018).*

(Continued)

*Primary Examiner* — Kenneth J Malkowski
(74) *Attorney, Agent, or Firm* — Rankin, Hill & Clark LLP

(57) ABSTRACT

The electromagnetic suspension apparatus includes: an electromagnetic actuator provided in parallel with a spring member between a vehicle body and a wheel of a vehicle and configured to generate driving force involving vibration damping of the vehicle body; an information acquisition unit configured to acquire, through a high-pass filter, time-series information about a stroke position of the electromagnetic actuator; and an ECU configured to calculate target driving force of the electromagnetic actuator and use the calculated target driving force to execute driving force control of the electromagnetic actuator. The ECU corrects the target driving force such that when the stroke position on the basis of the high-pass-filter-processed time-series information, from which low-frequency components (steady state deviation) have been removed, is present in a neutral region including a neutral position, spring force of the spring member is made (Continued)

weaker than when the stroke position is present in a non-neutral region.

8 Claims, 10 Drawing Sheets

(56) References Cited

U.S. PATENT DOCUMENTS

| | | | | |
|---|---|---|---|---|
| 2011/0218707 A1* | 9/2011 | Inoue | ............... | B60G 17/06 |
| | | | | 701/37 |
| 2015/0032332 A1* | 1/2015 | Kikuchi | ............... | B60W 10/06 |
| | | | | 701/37 |
| 2015/0224845 A1* | 8/2015 | Anderson | ............ | B60G 17/052 |
| | | | | 701/37 |

OTHER PUBLICATIONS

Translation of JP-2010126044, cited above, to Wataru et al. (Year: 2010).*

* cited by examiner

STEADY STATE VALUE DURING TRAVELING ON FLAT ROAD

STEADY STATE VALUE DURING TRAVELING ON FLAT ROAD

ROAD SURFACE INPUT ↕ UP/DOWN

ACTUAL VALUE FOR REAR SUSPENSION STROKE

STEADY STATE VALUE DURING TRAVELING ON UNDULATED ROAD

STEADY STATE DEVIATION

STEADY STATE VALUE DURING TRAVELING ON FLAT ROAD

FILTER-CORRECTED VALUE FOR REAR SUSPENSION STROKE

STEADY STATE VALUE DURING TRAVELING ON FLAT ROAD

ELECTROMAGNETIC SUSPENSION APPARATUS

TECHNICAL FIELD

The present invention relates to an electromagnetic suspension apparatus including an electromagnetic actuator which is provided in parallel with a spring member between a vehicle body and a wheel of a vehicle and generates a driving force involving vibration damping of the vehicle body.

BACKGROUND ART

Conventionally, there has been known an electromagnetic suspension apparatus including an electromagnetic actuator which is provided in parallel with a spring member between a vehicle body and a wheel of a vehicle and generates a driving force involving vibration damping of the vehicle body by an electric motor (for example, see Japanese Patent Application Publication No. 2010-132222). The electromagnetic actuator is configured to include a ball screw mechanism in addition to the electric motor. The electromagnetic actuator operates to generate the driving force involving the vibration damping of the vehicle body by converting rotational motion of the electric motor into linear motion of the ball screw mechanism.

SUMMARY OF INVENTION

Technical Problem

In the electromagnetic suspension apparatus according to Japanese Patent Application Publication No. 2010-132222, however, how to adjust spring force of the spring member in response to the stroke position of the electromagnetic actuator is neither disclosed nor suggested. Because of this, there is room for improvement in order to make ride comfort better depending on the magnitude of spring constant preset for the spring member.

The present invention has been made in light of the above situation. An aspect of the present invention provides an electromagnetic suspension apparatus that can fulfill the needs for ride comfort improvement regardless of the magnitude of spring constant preset for a spring member In addition, another aspect of the present invention provides an electromagnetic suspension apparatus allowing for the maintenance of good ride comfort regardless of whether a road slope is gradual or steep or a vehicle load weight is increased or decreased, whether a vehicle is accelerating or decelerating, or whether or not a vehicle is turning, etc.

An electromagnetic suspension apparatus comprising:

an electromagnetic actuator provided in parallel with a spring member between a vehicle body and a wheel of a vehicle and configured to generate driving force involving vibration damping of the vehicle body;

an information acquisition unit configured to acquire time-series information about a stroke position of the electromagnetic actuator; and a driving force control unit configured to calculate target driving force of the electromagnetic actuator and use the calculated target driving force to execute driving force control of the electromagnetic actuator. The information acquisition unit acquires, as the time-series information about the stroke position of the electromagnetic actuator, processed time-series information obtained after, among the time-series information about the stroke position of the electromagnetic actuator, information belonging to a predetermined low-frequency zone is attenuated and information belonging to a higher-frequency zone than the low-frequency zone is passed. The driving force control unit corrects the target driving force such that when the stroke position of the electromagnetic actuator on a basis of the processed time-series information acquired by the information acquisition unit is present in a neutral region including a neutral position, spring force of the spring member is made weaker than when the stroke position is present in a non-neutral region.

An aspect of the present invention provides maintaining good ride comfort regardless of the magnitude of spring constant preset for a spring member and regardless of whether a road slope is gradual or steep or a vehicle load weight is increased or decreased, whether a vehicle is accelerating or decelerating, or whether or not a vehicle is turning, etc.

DESCRIPTION OF EMBODIMENTS

Figure 1:
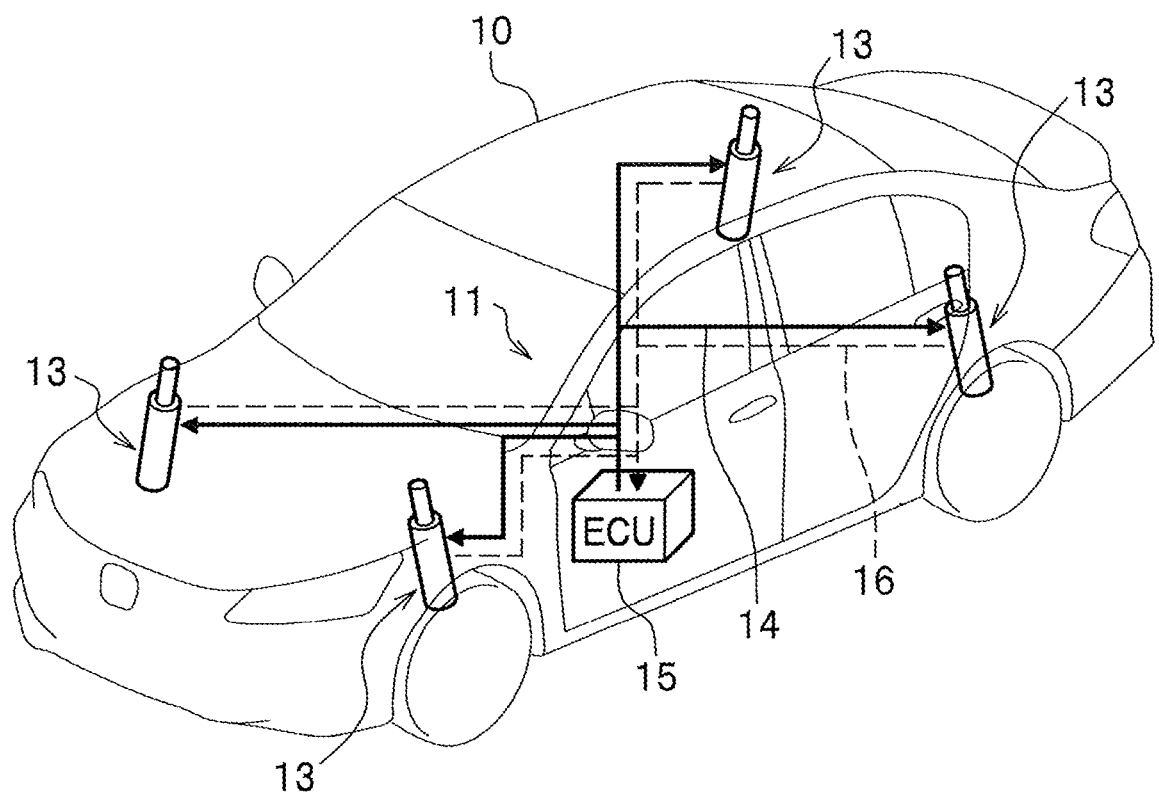
FIG. 1 is an overall configuration diagram of each electromagnetic suspension apparatus according to a reference example and an embodiment of the present invention.

Hereinafter, electromagnetic suspension apparatuses according to embodiments of the present invention are described in detail by appropriately referring to the Drawings.

Note that in the following figures, the same members or corresponding members have the same reference numerals. In addition, the size and shape of each member may be modified or schematically exaggerated for description convenience.

[Basic Configuration Common to Each Electromagnetic Suspension Apparatus 11 According to Reference Example and Embodiment of the Present Invention]

First, a basic configuration common to each electromagnetic suspension apparatus 11 according to a reference example and an embodiment of the present invention will be described with reference to FIGS. 1 and 2.

FIG. 1 is an overall configuration diagram of the electromagnetic suspension apparatus 11 according to the reference example (prerequisite technology) of the present invention. FIG. 2 is a partial cross-sectional view of an electromagnetic actuator 13 constituting a part of the electromagnetic suspension apparatus 11.

As shown in FIG. 1, the electromagnetic suspension apparatus 11 according to the reference example (prerequisite technology) of the present invention includes a plurality of electromagnetic actuators 13 respectively provided for wheels of a vehicle 10, and an electronic control unit (hereinafter, referred to as an "ECU") 15. The plurality of electromagnetic actuators 13 and the ECU 15 are connected to each other via a power supply line 14 (see the solid line in FIG. 1) for supplying drive control power from the ECU 15 to the plurality of electromagnetic actuators 13 and via a signal line 16 (see the dashed line in FIG. 1) for transmitting a stroke position of the electromagnetic actuator 13 from each of the plurality of electromagnetic actuators 13 to the ECU 15.

In the present embodiment, four electromagnetic actuators 13 are respectively provided for the wheels including front wheels (left front wheel/right front wheel) and rear wheels (left rear wheel/right rear wheel).

In this embodiment, each of the plurality of electromagnetic actuators 13 has a common configuration. Thus, the plurality of electromagnetic actuators 13 will be described by describing, as a representative example, a configuration of one electromagnetic actuator 13.

Figure 2:
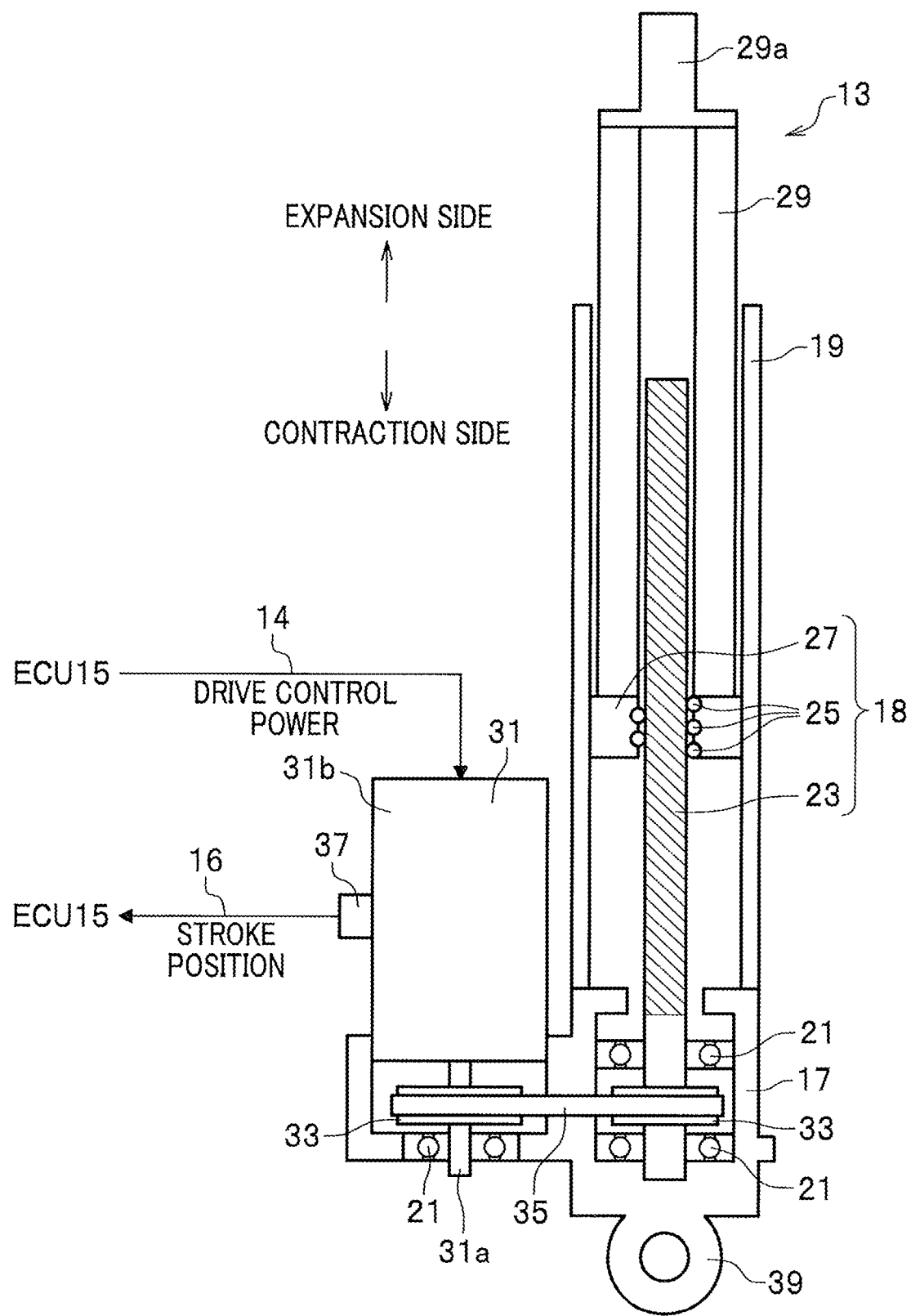
FIG. 2 is a partial cross-sectional view of an electromagnetic actuator provided in the electromagnetic suspension apparatus.

As shown in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base end of the ball screw shaft 23 rotatably axially via the ball bearing 21. The outer tube 19 is provided on the base housing 17 and accommodates a ball screw mechanism 18 including the ball screw shaft 23, the plurality of balls 25, and the nut 27.

The plurality of balls 25 roll along a screw groove of the ball screw shaft 23. The nut 27 is engaged with the ball screw shaft 23 via the plurality of balls 25, and converts rotational motion of the ball screw shaft 23 into linear motion in an axial direction of the ball screw shaft 23. The inner tube 29 connected to the nut 27 is integrated with the nut 27 and displaced in an axial direction of the outer tube 19.

As shown in FIG. 2, the electromagnetic actuator 13 includes the electric motor 31, a pair of pulleys 33, and a belt 35 in order to transmit a rotational driving force to the ball screw shaft 23.

The electric motor 31 is provided on the base housing 17 so as to be arranged in parallel with the outer tube 19. The pulleys 33 are respectively attached to a motor shaft 31a of the electric motor 31 and the ball screw shaft 23. The belt 35 for transmitting the rotational driving force of the electric motor 31 to the ball screw shaft 23 is wrapped around the pair of pulleys 33.

The electric motor 31 is provided with a resolver 37 for detecting and outputting a rotation angle signal of the electric motor 31. The rotation angle signal of the electric motor 31 detected by the resolver 37 is sent to the ECU 15 via the signal line 16. In the present embodiment, a rotation angle of the electric motor 31 can be replaced with the stroke position of the electromagnetic actuator 13. This is because the stroke position of the electromagnetic actuator 13 is displaced to an expansion side or a contraction side (see FIG. 2) according to a displacement of the rotation angle of the electric motor 31.

The electric motor 31 is controlled to be rotationally driven in accordance with the magnitude of the drive control power to be supplied to each of the plurality of electromagnetic actuators 13 via the power supply line 14 by the ECU 15.

As shown in FIG. 2, in the electromagnetic actuator 13 according to the present invention, a dimension in the axial direction of the electromagnetic actuator 13 is shortened by employing a layout in which the motor shaft 31a of the electric motor 31 and the ball screw shaft 23 are arranged substantially in parallel to be connected to each other. However, instead of the above parallel arrangement layout, another layout may be employed in which the motor shaft 31a of the electric motor 31 and the ball screw shaft 23 are coaxially arranged to be connected to each other.

As shown in FIG. 2, in the electromagnetic actuator 13 according to the present embodiment, a connecting portion 39 is provided at a lower end of the base housing 17. The connecting portion 39 is connected and fixed to an unsprung member (not shown: a lower arm, a knuckle, etc., on the wheel side). On the other hand, the upper end 29a of the inner tube 29 is connected and fixed to a sprung member (not shown: a strut tower, etc., on the vehicle body side). In short, the electromagnetic actuator 13 is arranged in parallel with a mechanical spring member (not shown) provided between the vehicle body and the wheel of the vehicle 10 in a state in which they are assembled on the vehicle 10.

The electromagnetic actuator 13 configured as described above operates as follows. That is, for example, it is assumed that an external force related to an upward vibration is input to the connecting portion 39 from the wheel side of the vehicle 10. In this case, the inner tube 29 and the nut 27 integrally descend with respect to the outer tube 19 to which the external force related to the upward vibration is applied. In response to this, the ball screw shaft 23 rotates in a direction following the nut 27 descending. At this time, the rotational driving force of the electric motor 31 in a direction preventing the nut 27 from descending is generated. The rotational driving force of the electric motor 31 is transmitted to the ball screw shaft 23 via the belt 35.

In this way, the vibration transmitted from the wheel side to the vehicle body side is attenuated by applying a damping force (force in a direction different from a direction of the stroke speed) which is a reaction force against the external force related to the upward vibration to the ball screw shaft 23.

[Internal Configuration of ECU 15]

Figure 3:
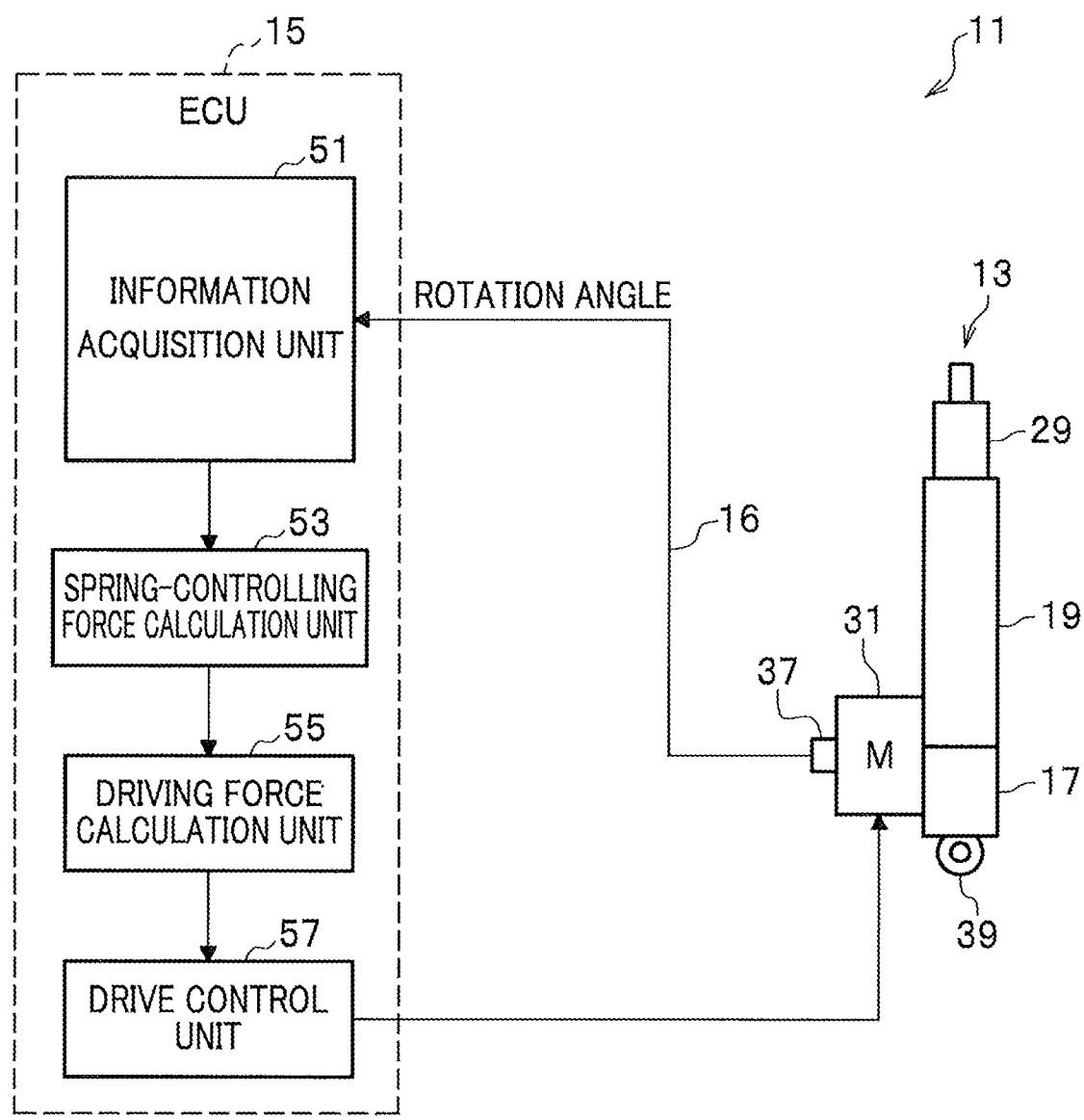
FIG. 3 is an internal configuration diagram of an ECU provided in the electromagnetic suspension apparatus.

Next, an internal configuration of the ECU 15 provided in the electromagnetic suspension apparatus 11 will be described with reference to FIG. 3. FIG. 3 is an internal configuration diagram of the ECU 15 provided in the electromagnetic suspension apparatus 11.

The ECU 15 includes a microcomputer for performing various arithmetic processing. The ECU 15 controls driving of each of the plurality of electromagnetic actuators 13, based on the rotation angle of the electric motor 31 as detected by the resolver 37, that is, time-series information about the stroke position of the electromagnetic actuator 13, so as to exert a driving force control function for generating driving force involving vibration damping of the vehicle body. The ECU 15 corresponds to a "driving force control unit" of the present invention.

In order to realize such a driving force control function, the ECU 15 includes an information acquisition unit 51, a spring-controlling force calculation unit 53, a driving force calculation unit 55, and a drive control unit 57 as shown in FIG. 3.

The information acquisition unit 51 acquires the rotation angle of the electric motor 31 as detected by the resolver 37, that is, time-series information about the stroke position of the electromagnetic actuator 13. As used herein, the time-series information about the stroke position of the electromagnetic actuator 13 (hereinafter, sometimes referred in short to "stroke position time-series information") means stored information associated, at corresponding times, with data on the rotation angle of the electric motor 31, which data reflects the stroke position changing moment by moment.

The time-series information about the stroke position of the electromagnetic actuator 13 as acquired by the information acquisition unit 51 is sent to each of the spring-controlling force calculation unit 53 and the driving force calculation unit 55.

Further, the information acquisition unit 51 calculates a relative speed between the sprung member and the unsprung member of the vehicle 10 (hereinafter, simply sometimes referred to as a "relative speed") by time differentiating the data on the rotation angle of the electric motor 31. In this regard, the relative speed as so calculated is strongly associated with the stroke speed of the ball screw shaft 23 and the rotation angular velocity of the electric motor 31. That is, the relative speed can be used by replacing the stroke speed of the ball screw shaft 23 and the rotation angular velocity of the electric motor 31. Time-series signals of the relative speed as calculated (acquired) by the information acquisition unit 51 are sent to the driving force calculation unit 55.

By appropriately referring to the stroke position based on the stroke position time-series information acquired by the information acquisition unit 51 and the below-described first correction ratio map 65 for spring-controlling force, the spring-controlling force calculation unit 53 calculates spring-controlling force for correcting spring force of the mechanical spring member. Information about the spring-controlling force calculated by the spring-controlling force calculation unit 53 is sent to the driving force calculation unit 55. Note that what is calculated by the spring-controlling force calculation unit 53 will be described later in detail.

The driving force calculation unit 55 calculates a base value for damping force by appropriately referring to the information on the relative speed acquired by the information acquisition unit 51 and the below-described damping force map 61. Also, the driving force calculation unit 55 calculates target driving force by adding, to the calculated base value for damping force, the spring-controlling force calculated by the spring-controlling force calculation unit 53. Driving force-controlling signals, which are the calculation results of the driving force calculation unit 55 so as to implement the target driving force, are sent to the drive control unit 57. What is calculated by the driving force calculation unit 55 will be described later in detail.

The drive control unit 57 supplies the drive control power to the electric motors 31, which are respectively provided in the plurality of electromagnetic actuators 13, in accordance with the driving force-controlling signal sent from the driving force calculation unit 55, and thus independently controls driving of each of the plurality of electromagnetic actuators 13. For example, an inverter control circuit can be suitably used for generating the drive control power to be supplied to the electric motor 31.

[Block Configuration of Spring-Controlling Force Calculation Unit 53, Driving Force Calculation Unit 55, and Their Surroundings According to Reference Example of the Present Invention]

Figure 4A:
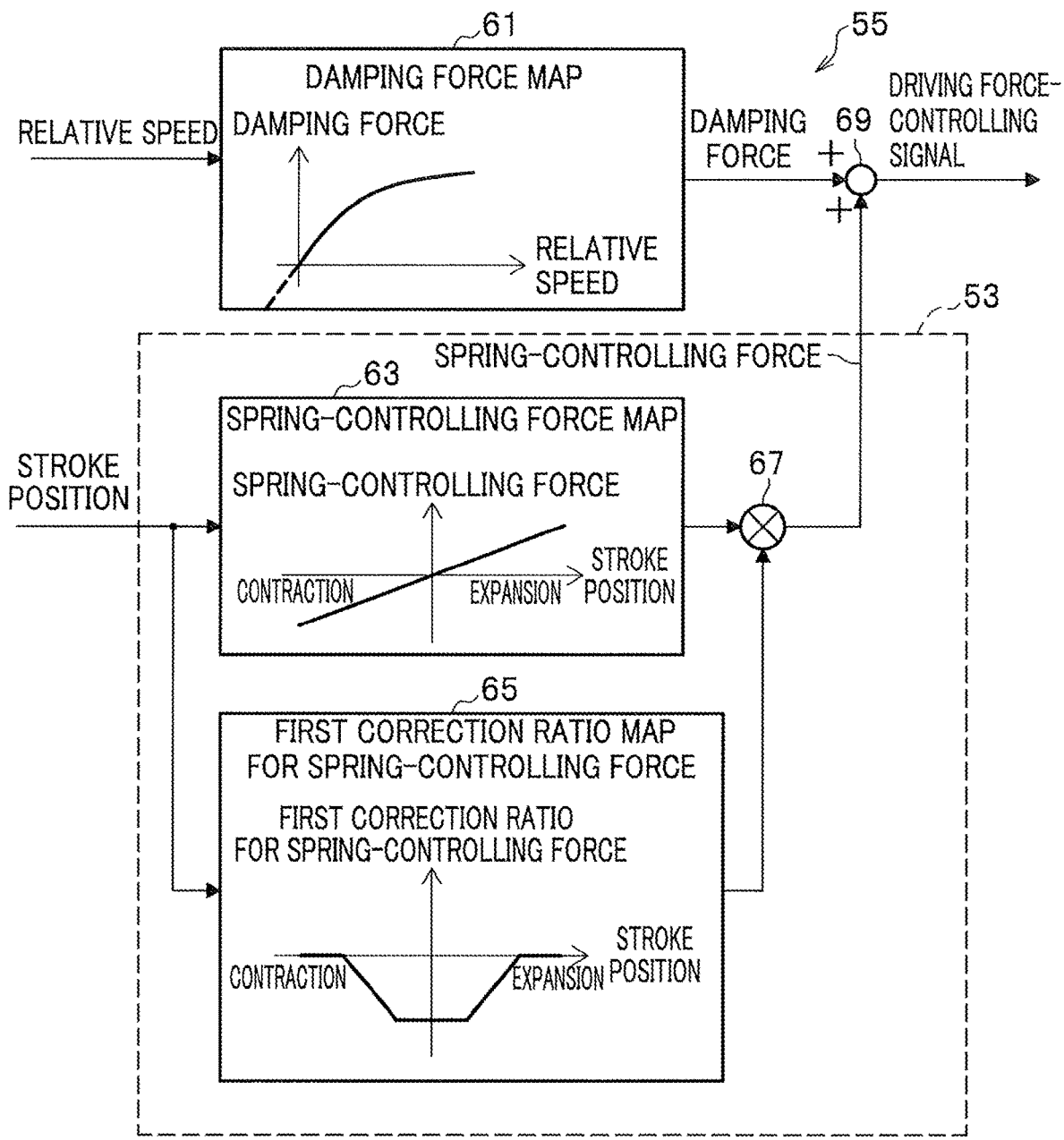
FIG. 4A is a block diagram of a spring-controlling force calculation unit, a driving force calculation unit, and their surroundings of the ECU provided in the electromagnetic suspension apparatus according to the reference example of the present invention.
Figure 4B:
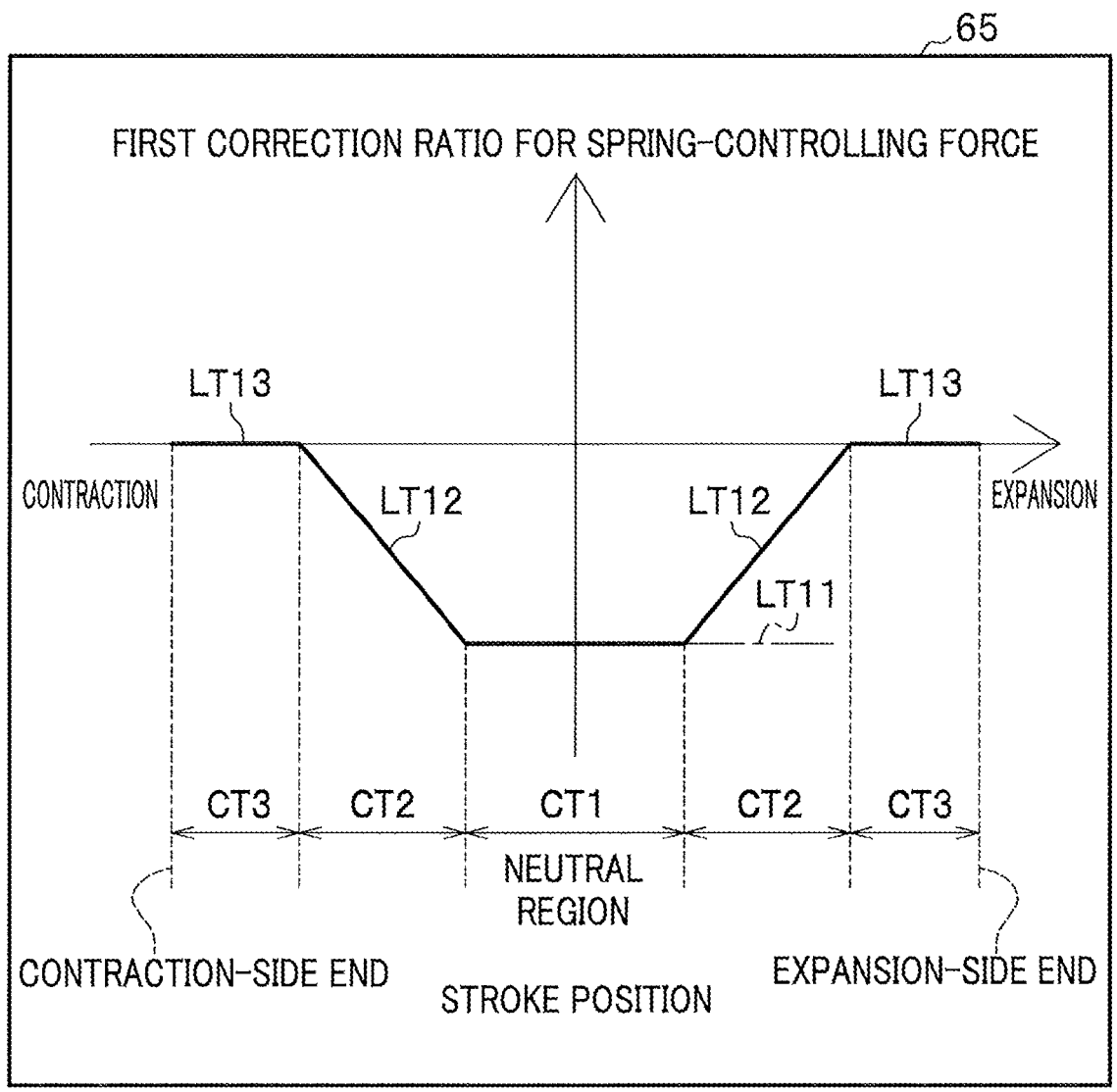
FIG. 4B is an explanatory diagram of a first correction ratio map for spring-controlling force, which map is included in the driving force calculation unit illustrated in FIG. 4A.

Next a block configuration of the spring-controlling force calculation unit 53, the driving force calculation unit 55, and their surroundings of the ECU 15 included in the electromagnetic suspension apparatus 11 according to the reference example of the present invention will be described with reference to FIGS. 4A and 4B. FIG. 4A is a block diagram of the spring-controlling force calculation unit 53, the driving force calculation unit 55, and their surroundings according to the reference example of the present invention. FIG. 4B is an explanatory diagram of a first correction ratio map 65 for spring-controlling force, which map is included in the spring-controlling force calculation unit 53 illustrated in FIG. 4A.

The spring-controlling force calculation unit 53 according to the reference example of the present invention includes, as shown in FIG. 4A, a spring-controlling force map 63, the first correction ratio map 65 for spring-controlling force, and a multiplier 67.

The spring-controlling force map 63, as shown in FIG. 4A, stores base values for spring-controlling force changing in response to a change in the stroke position. Note that the base value for spring-controlling force is actually stored as a current value for spring-controlling force.

In an example shown in FIG. 4A, the spring-controlling force is characterized in that as the stroke position of the electromagnetic actuator 13 on the expansion side or the contraction side is apart more from the neutral position as an origin, the absolute value for the spring-controlling force (force for making the spring return to the neutral position) increases linearly. Note that when the stroke position of the electromagnetic actuator 13 stays at the neutral position, the corresponding spring-controlling force is zero. Here, the case where the stroke position of the electromagnetic actuator 13 stays at the neutral position occurs, in principle, when the vehicle 10 is in a horizontally static state (1 G).

Provided that a configuration where the neutral position of the stroke of the electromagnetic actuator 13 is suitably shifted depending on the load weight of the vehicle 10, etc., may be adopted.

By referring to the stroke position based on the stroke position time-series information acquired by the information acquisition unit 51 and the stored content of the spring-controlling force map 63, the spring-controlling force calculation unit 53 according to the reference example of the present invention calculates a base value (target value of spring-controlling force) for spring-controlling force corresponding to the stroke position. The calculated base value for spring-controlling force is sent to the multiplier 67.

The first correction ratio map 65 for spring-controlling force, as shown in FIG. 4A, stores the value of the first correction ratio for spring-controlling force changing in response to a change in the stroke position. The first correction ratio for spring-controlling force uses any value between −1 to 0 (including −1 and 0). In the spring-controlling force calculation unit 53 according to the reference example of the present invention, the base value for spring-controlling force is multiplied by the value of the first correction ratio for spring-controlling force. This makes it possible to correct the base value for spring-controlling force to a value fit for the stroke position changing moment by moment.

The characteristics of the first correction ratio for spring-controlling force as stored in the first correction ratio map 65 for spring-controlling force will be described with reference to FIG. 4B.

In the case where the stroke position is present in a neutral region CT1 including the neutral position, the value of the first correction ratio LT11 for spring-controlling force is set to a fixed value "−1".

In addition, in the cases where the stroke position is present in an intermediate region CT2 or CT2 between the expansion-side end region CT3 and the contraction-side end region CT3, the value of the first correction ratio LT12 for spring-controlling force is set to a variable such that as the stroke position is located closer to the expansion-side end or the contraction-side end relative to the neutral side, the value increases linearly and gradually.

In the cases where the stroke position is present in the expansion-side end region CT3, which is at or near the expansion-side end, or the contraction-side end region CT3, which is at or near the contraction-side end, the value of the first correction ratio LT13 for spring-controlling force is set to a fixed value "0".

Note that the width of the neutral region CT1 and the width of the expansion-side or contraction-side end region CT3 with respect to the stroke range of the electromagnetic actuator 13 can be suitably determined, through experimentation and simulation, to be a value in view of how much a force from the electromagnetic actuator 13 applied to the spring member is made smaller and in view of beforehand preventing the electromagnetic actuator 13 from getting into a full bump or full rebound state.

When the stroke position is present in the neutral region CT1 including the neutral position, the value of the first correction ratio LT11 for spring-controlling force is set such that the spring-controlling force is a negative value, the absolute number of which is larger than that when the stroke position is present in the non-neutral region CT2 or CT3 other than the neutral region CT1. This is because in the case where the stroke position is present in the neutral region CT1 including the neutral position, weakening the spring force of the mechanical spring member means that the force applied to the spring member is made smaller.

The spring constant of the mechanical spring member is preset to a relatively larger value in order to fulfill the needs of reliably supporting the vehicle body of the vehicle 10 by the spring member even if the electromagnetic actuator 13 is failed.

Then, in the case where the stroke position is present in the neutral region CT1 including the neutral position, the value of the first correction ratio LT11 for spring-controlling force is set to a negative value, the absolute number of which is larger than that of LT12 or LT13, so as to weaken the spring force of the spring member. This makes it possible to improve ride comfort because the spring-controlling force is corrected to a negative value, the absolute number of which is large (the target driving force is obtained by decreasing the damping force by the spring-controlling force).

Meanwhile, in the case where the stroke position is present in the expansion-side or contraction-side end region CT3, the value of the first correction ratio LT13 for spring-controlling force is set to a fixed value "0".

This is because in the case where the stroke position is present in the expansion-side or contraction-side end region CT3, the electromagnetic actuator 13 may get into a full bump or full rebound state.

Then, in the case where the stroke position is present in the expansion-side or contraction-side end region CT3, the spring-controlling force is corrected such that how much the spring force of the spring member is weakened is made smaller than when the stroke position is present in the intermediate region CT2.

Note that the wording "how much the spring force of the spring member is weakened is made smaller" includes an embodiment in which control for weakening the spring force of the spring member (hereinafter, the "control for weakening the spring force of the spring member" may be referred to in short as "spring force-weakening control") is not executed.

That is, in the case where the stroke position is present in the expansion-side or contraction-side end region CT3, the spring force-weakening control is not executed. This makes it possible to beforehand prevent the electromagnetic actuator 13 from getting into a full bump or full rebound state and to fulfill the needs of power saving.

The multiplier 67 of the spring-controlling force calculation unit 53 calculates the spring-controlling force value corrected based on the stroke position as obtained by multiplying the base value for spring-controlling force, which base value has been calculated with reference to the spring-controlling force map 63, by the value of the first correction ratio for spring-controlling force, which value has been calculated with reference to the first correction ratio map 65 for spring-controlling force. The calculated spring-controlling force value corrected based on the stroke position is sent to an adder 69 as described below.

Meanwhile, the driving force calculation unit 55 according to the reference example of the present invention includes the damping force map 61 and the adder 69 as shown in FIG. 4A.

The damping force map 61, as shown in FIG. 4A, stores a base value for damping force changing in response to a change in the relative speed. Note that the base value for damping force is actually stored as a control current value for damping force.

In an example shown in FIG. 4A, the damping force is characterized in that as the relative speed increases, the damping force increases logarithmically. This characteristic conforms to the characteristic of a conventional hydraulic damper. Note that when the relative speed is zero, the corresponding damping force is also zero.

The driving force calculation unit 55 according to the reference example of the present invention calculates a base value for damping force corresponding to the relative speed by referring to the relative speed acquired by the information acquisition unit 51 and the stored content of the damping force map 61. The calculated base value for damping force is sent to the adder 69.

Also, the adder 69 of the driving force calculation unit 55 according to the reference example of the present invention generates driving force-controlling signals, which are based on the target driving force obtained by integrating the damping force and the spring-controlling force, by adding the value for spring-controlling force, which value has been calculated by the spring-controlling force calculation unit 53, to the base value for damping force, which base value has been calculated with reference to the damping force map 61. The generated driving force-controlling signals based on the target driving force are sent to the drive control unit 57. Once receiving the signals, the drive control unit 57 executes drive control of the plurality of electromagnetic actuators 13.

[How Electromagnetic Suspension Apparatus 11 According to Reference Example of the Present Invention Operates]

Figure 5:
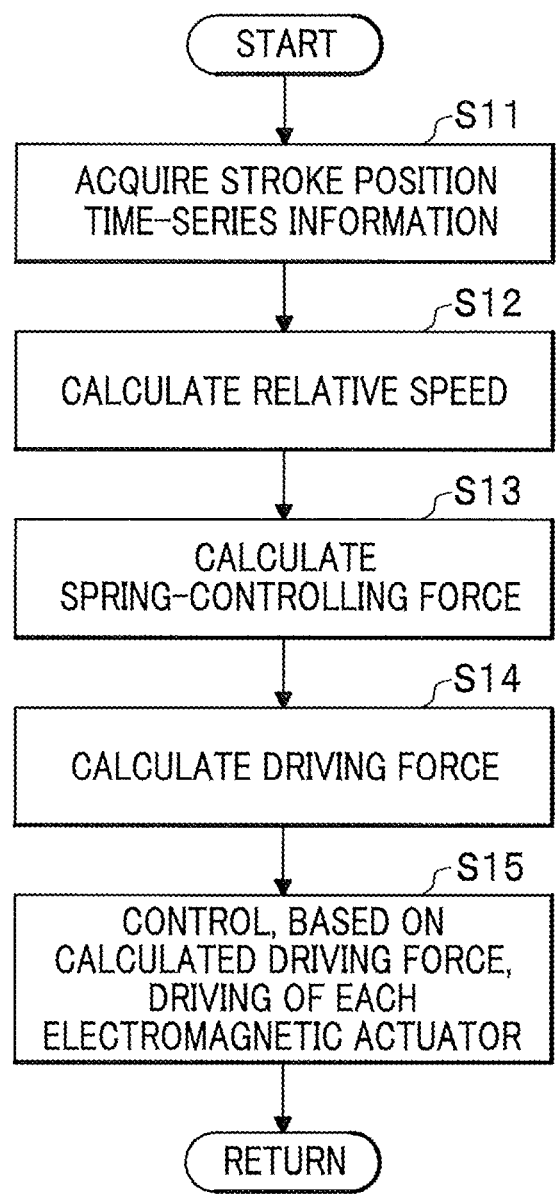
FIG. 5 is a flowchart illustrating how the electromagnetic suspension apparatus according to the reference example of the present invention works.

Next, how the electromagnetic suspension apparatus 11 according to the reference example of the present invention operates will be described with reference to FIG. 5. FIG. 5 is a flowchart illustrating how the electromagnetic suspension apparatus 11 according to the reference example of the present invention works.

At step S11 (of acquiring stroke position time-series information) of FIG. 5, the information acquisition unit 51 of the ECU 15 acquires time-series information about the stroke position of the electromagnetic actuator 13 by using time-series information about the rotation angle of the electric motor 31, which angle is detected by the resolver 37.

At step S12 (of calculating a relative speed), the information acquisition unit 51 of the ECU 15 calculates information about the relative speed (in contraction direction/ expansion direction) between the sprung member and the unsprung member of the vehicle 10 by time differentiating time-series signals of the rotation angle of the electric motor 31 as acquired at step S11. The calculated relative speed information is sent to the driving force calculation unit 55.

At step S13 (of calculating spring-controlling force), the spring-controlling force calculation unit 53 of the ECU 15 calculates a base value for spring-controlling force corresponding to the stroke position by referring to the stroke position information based on the stroke position time-series information acquired at step S11 and the stored content of the spring-controlling force map 63.

In addition, the spring-controlling force calculation unit 53 calculates the value of the first correction ratio for spring-controlling force corresponding to the stroke position by referring to the stroke position information acquired at step S11 and the stored content of the first correction ratio map 65 for spring-controlling force.

Further, the multiplier 67 of the spring-controlling force calculation unit 53 multiplies the base value for spring-controlling force by the value of the first correction ratio for spring-controlling force.

As described above, the spring-controlling force calculation unit 53 corrects the base value for spring-controlling force to a value fit for the stroke position changing moment by moment. The calculated, corrected value for the spring-controlling force is sent to the adder 69 of the driving force calculation unit 55.

At step S14 (of calculating driving force), the driving force calculation unit 55 of the ECU 15 calculates a base value for damping force corresponding to the relative speed by referring to the information about the relative speed between the sprung member and the unsprung member of vehicle 10, which information has been calculated (acquired) at step S12 by the information acquisition unit 51, and the stored content (the base value, i.e. target value, for damping force changing in response to a change in the relative speed) of the damping force map 61.

Next, the adder 69 of the driving force calculation unit 55 generates driving force-controlling signals, which are based on the target driving force obtained by integrating the damping force and the spring-controlling force, by adding the corrected value for spring-controlling force corresponding to the stroke position, which value has been calculated at step S13 by the spring-controlling force calculation unit 53, to the base value for damping force corresponding to the relative speed as described above.

At step S15, the drive control unit 57 of the ECU 15 supplies the drive control power to the electric motors 31, which are respectively provided in the plurality of electromagnetic actuators 13, in accordance with the driving force-controlling signal based on the target driving force calculated at step S14, and thus controls driving of each of the plurality of electromagnetic actuators 13.

In the electromagnetic suspension apparatus 11 according to the reference example of the present invention, the base value for damping force corresponding to the relative speed is calculated by referring to the damping force map 61; meanwhile, the base value for spring-controlling force corresponding to the stroke position is calculated by referring to the spring-controlling force map 63; at the same time, the corrected value for spring-controlling force is calculated by multiplying the calculated base value for spring-controlling force by the value of the first correction ratio for spring-controlling force corresponding to the stroke position; and the target driving force obtained by integrating the above calculated base value for damping force and the corrected value for spring-controlling force is used to control driving of the electromagnetic actuator 13.

Here, when the stroke position is present in the neutral region CT1 including the neutral position, the spring-controlling force calculation unit 53 according to the reference example of the present invention calculates, as the correction value for spring-controlling force, a negative value, the absolute number of which is larger than that when the stroke position is present in the non-neutral region CT2 or CT3. This means that the spring force of the mechanical spring member is weakened (the force applied to the spring member is made smaller). This enables ride comfort to improve.

The electromagnetic suspension apparatus 11 according to the reference example of the present invention can fulfill the needs for ride comfort improvement regardless of the magnitude of spring constant preset for the spring member.

[Electromagnetic Suspension Apparatus 11 According to Embodiment of the Present Invention]

Next, an electromagnetic suspension apparatus 11 according to an embodiment of the present invention will be described with reference to FIGS. 6 and 7.

Figure 6:
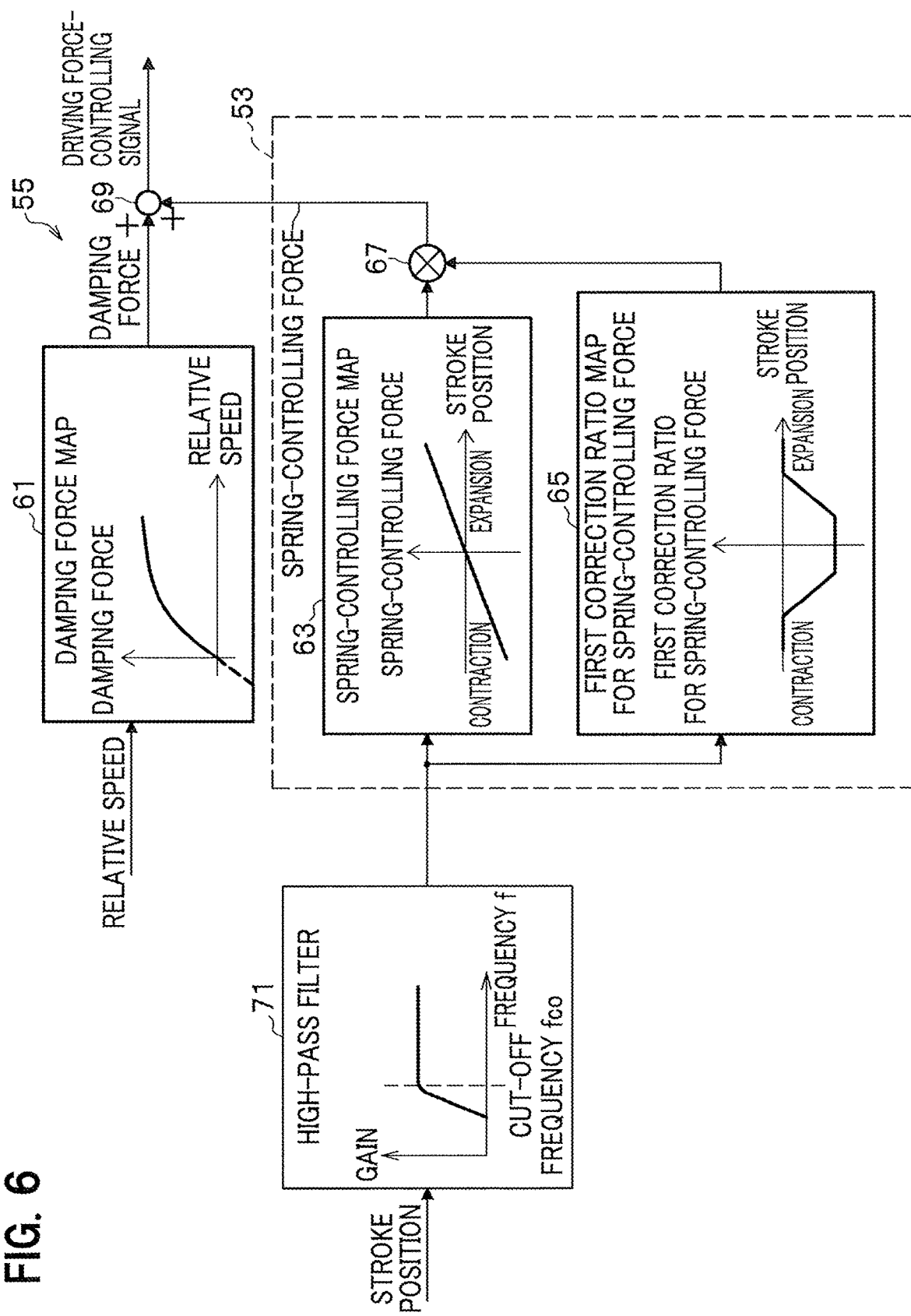
FIG. 6 is a block diagram of a spring-controlling force calculation unit, a driving force calculation unit, and their surroundings of the ECU provided in the electromagnetic suspension apparatus according to the embodiment of the present invention.

FIG. 6 is a block diagram of the spring-controlling force calculation unit 53, the driving force calculation unit 55, and their surroundings of the ECU 15 provided in the electromagnetic suspension apparatus 11 according to the embodiment of the present invention. FIG. 7 is a flowchart illustrating how the electromagnetic suspension apparatus 11 according to the embodiment of the present invention works.

In the electromagnetic suspension apparatus 11 according to the reference example of the present invention, when the stroke position of the electromagnetic actuator 13 as based on the stroke position time-series information acquired by the information acquisition unit 51 is present in the neutral region including the neutral position, executed is spring force-weakening control for making spring force of the spring member weaker than when the stroke position is present in one of the non-neutral regions. This enables ride comfort to improve while preventing the electromagnetic suspension apparatus 11 from getting into a bump or rebound state.

Unfortunately, in the electromagnetic suspension apparatus 11 according to the reference example, the spring force-weakening control in response to the stroke position of the electromagnetic actuator 13 is executed without taking into consideration load conditions of the electromagnetic suspension apparatus 11 (e.g., an increase or decrease in load weight; a traveling path including an uphill road, flat road, downhill road, straight road, or curve; a steep or gradual road slope). Here, it is possible to suppose the case where the spring force-weakening control corresponding to the stroke position is executed while the vehicle 10 is traveling on, for instance, a slope or curve. In such a case, there are problems of making the behavior (attitude) of the vehicle 10 unstable and causing a risk of wasted power consumption.

The mechanisms of causing such problems will be illustrated below one by one.

Generally speaking, the frequency zone of vehicle vibration of the vehicle 10, an occupant of which feels and is sensitive to how good or bad the ride comfort is, should be approximately between 1 Hz and 20 Hz. Due to the above, a road surface input belonging to such a frequency zone largely affects how the occupant feels about the ride comfort.

For instance, the occupant of the vehicle 10 feels that the traveling path where a vehicle vibration frequency belonging to a frequency zone of 1 Hz or less occurs is not a rough road but a slope.

Now, the case is assumed where the vehicle 10 travels on an uphill road among slopes (where a vehicle body vibration frequency belonging to a frequency zone of 1 Hz or less occurs). On the uphill road, the rear-side electromagnetic suspension apparatuses 11 have a constantly occurring contraction-side stroke corresponding to the vehicle body mass and the inclination angle of the vehicle 10. Then, the spring-controlling force calculation unit 53 according to the reference example calculates a base value for spring-controlling force corresponding to the stroke position by referring to the constantly occurring contraction-side stroke position information and the stored content of the spring-controlling force map 63.

The calculated base value for spring-controlling force based on the constantly occurring contraction-side stroke position information is a value uselessly larger, in a sense that the value does not contribute to ride comfort improvement, than the base value for spring-controlling force based on the stroke position information obtained during traveling on a flat road. On top of that, the case where the vehicle travels on a long uphill road, for instance, like a road across a mountain has a large useless power consumption due to the constantly occurring contraction-side stroke.

Here, the original purpose of the spring force-weakening control in response to the stroke position of the electromagnetic actuator 13 is that a road surface roughness input is transferred as less as possible to objects (vehicle body) over the spring. However, when the vehicle 10 is traveling on an uphill road among slopes (there is a constantly occurring contraction-side stroke), the spring force-weakening control in response to the stroke position may be executed in some cases. In such cases, the steady state stroke position has a steady state deviation offset on the contraction side relative to the original neutral position. This may make the behavior (attitude) of the vehicle 10 unstable and may cause useless power consumption (in a sense that theoretically unnecessary spring force-weakening control is executed).

The above-described problems caused by the steady state load on the electromagnetic suspension apparatus 11 likewise occur in the case where the load weight of the vehicle 10 is changed, the case where acceleration or deceleration in the front-rear direction occurs while the vehicle 10 is accelerating or decelerating, and the case where acceleration or deceleration in the lateral direction occurs while the vehicle 10 is turning.

To solve the above problems, adopted is the configuration where the electromagnetic suspension apparatus 11 according to the embodiment of the present invention acquires, as the time-series information about the stroke position of the electromagnetic actuator 13, processed time-series information obtained after, among the time-series information about the stroke position of the electromagnetic actuator 13, information belonging to a predetermined low-frequency zone is attenuated and information belonging to a higher-frequency zone than the low-frequency zone is passed; and the target driving force is corrected (the spring force-weakening control is executed) such that when the stroke position of the electromagnetic actuator 13 on the basis of the processed time-series information acquired is present in the neutral region including the neutral position, spring force of the spring member is made weaker than when the stroke position is present in one of the non-neutral regions.

Here, the electromagnetic suspension apparatus 11 according to the reference example of the present invention and the electromagnetic suspension apparatus 11 according to the embodiment of the present invention both share many elements. Here, attention is paid to element differences between the both and the differences are described. This is in place of the explanation of the electromagnetic suspension apparatus 11 according to the embodiment of the present invention.

In the electromagnetic suspension apparatus 11 according to the reference example of the present invention, raw data (stroke position time-series information) about the rotation angle of each electric motor 31, which rotation angle has been detected by the resolver 37, is directly sent to each of the spring-controlling force calculation unit 53 and the driving force calculation unit 55.

By contrast, in the electromagnetic suspension apparatus 11 according to the embodiment of the present invention, processed time-series information obtained after raw data (stroke position time-series information) about the rotation angle of each electric motor 31, which rotation angle has been detected by the resolver 37, is subjected to given high-pass filter processing is sent to each of the spring-controlling force calculation unit 53 and the driving force calculation unit 55. This point is a difference from the electromagnetic suspension apparatus 11 according to the reference example.

To perform the above given high-pass filter processing, as shown in FIG. 6, a high-pass filter 71 is provided on the side upstream of the spring-controlling force calculation unit 53 and the driving force calculation unit 55.

The high-pass filter 71 has an input of raw data (stroke position time-series information) about the rotation angle of each electric motor 31, which rotation angle has been detected by the resolver 37; the gain of information belonging to a low-frequency zone (f<fco) having a prescribed cut-off frequency fco as a threshold among the input time-series information is attenuated; and at the same time, the gain of information belonging to a higher-frequency zone (f>fco) than the low-frequency zone is passed as it is without attenuation to output processed time-series information.

This processing removes the low-frequency components (f<fco) included in the raw data (stroke position time-series information) but the high-frequency components (f>fco) remain. This results in a solution to the above problems due to the low-frequency components (f<fco) included in the raw data (stroke position time-series information).

Note that the prescribed cut-off frequency fco will be described in detail below.

[Overview of How Electromagnetic Suspension Apparatus 11 According to Embodiment of the Present Invention Operates]

Next, an overview of how the electromagnetic suspension apparatus 11 according to the embodiment of the present invention operates will be illustrated with reference to FIG. 7. Note that many overlapping portions are present between the operation of the electromagnetic suspension apparatus 11 according to the embodiment and the operation of the electromagnetic suspension apparatus 11 according to the reference example. Here, operation portions shared between the both are described in short; and attention is paid to operation portions different between the both and the differences are described. This is in place of the explanation of how the electromagnetic suspension apparatus 11 according to the embodiment of the present invention works.

Figure 7:
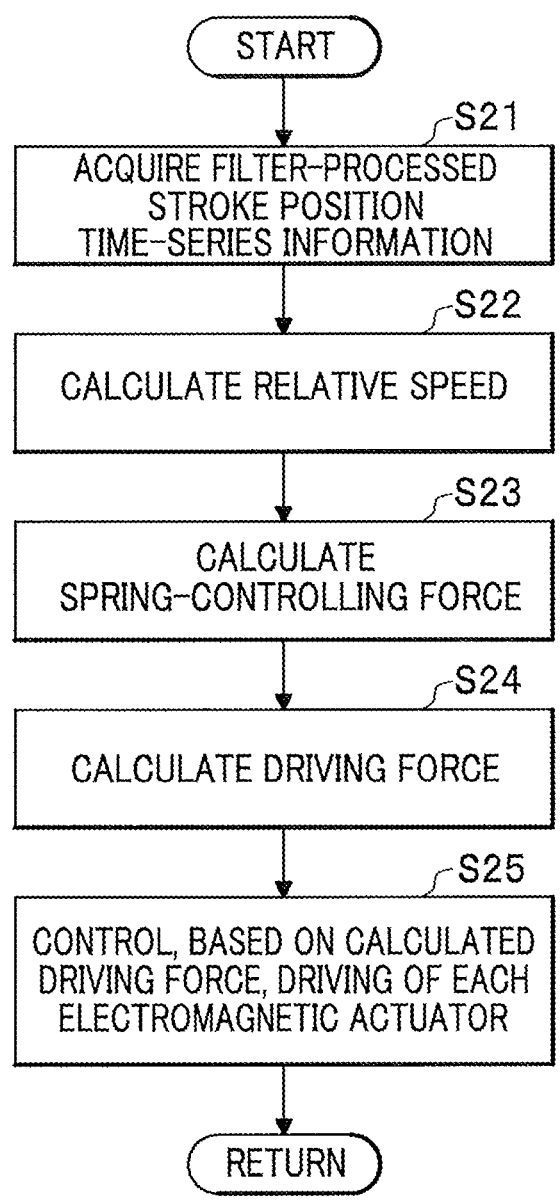
FIG. 7 is a flowchart illustrating how the electromagnetic suspension apparatus according to the embodiment works.

At step S21 (of acquiring filter-processed stroke position time-series information) of FIG. 7, in the information acquisition unit 51 of the ECU 15, raw data about the rotation angle of each electric motor 31 (stroke position time-series information) is subjected to given high-pass filter processing; and the processed time-series information is acquired as stroke position time-series information of the electromagnetic actuator 13.

At step S22 (of calculating a relative speed), the information acquisition unit 51 of the ECU 15 calculates information about the relative speed between the sprung member and the unsprung member of the vehicle 10.

At step S23 (of calculating spring-controlling force), the spring-controlling force calculation unit 53 of the ECU 15 calculates a base value for spring-controlling force corresponding to the high-pass-filter-processed stroke position by referring to stroke position information based on the high-pass-filter-processed (i.e., the steady state deviation derived from the low-frequency components is removed) stroke position time-series information acquired at step S21 and the stored content of the spring-controlling force map 63.

In addition, the spring-controlling force calculation unit 53 calculates the value of the first correction ratio for spring-controlling force corresponding to the high-pass-filter-processed stroke position by referring to stroke position information based on the high-pass-filter-processed stroke position time-series information acquired at step S21 and the stored content of the first correction ratio map 65 for spring-controlling force.

Further, the multiplier 67 of the spring-controlling force calculation unit 53 multiplies the base value for spring-controlling force by the value of the first correction ratio for spring-controlling force.

As described above, the spring-controlling force calculation unit 53 corrects the base value for spring-controlling force to a value fit for the stroke position changing moment by moment. The calculated, corrected value for the spring-controlling force is sent to the adder 69 of the driving force calculation unit 55.

At step S24 (of calculating driving force), the driving force calculation unit 55 of the ECU 15 calculates a base value for damping force corresponding to the relative speed.

Next, the adder 69 of the driving force calculation unit 55 generates driving force-controlling signals, which are based on the target driving force obtained by integrating the damping force and the spring-controlling force, by adding the corrected value for spring-controlling force, which value has been corrected in view of the high-pass-filter-processed (i.e., the steady state deviation derived from the low-frequency components has been removed) stroke position calculated at step S23 by the spring-controlling force calculation unit 53, to the base value for damping force corresponding to the relative speed.

At step S25, the drive control unit 57 of the ECU 15 supplies the drive control power to the electric motors 31, which are respectively provided in the plurality of electromagnetic actuators 13, in accordance with the driving force-controlling signal based on the target driving force calculated at step S24, and thus controls driving of each of the plurality of electromagnetic actuators 13.

[How Electromagnetic Suspension Apparatus 11 According to Embodiment of the Present Invention Operates Specifically]

Next, how the electromagnetic suspension apparatus 11 according to the embodiment of the present invention operates specifically will be illustrated with reference to FIGS. 8A to 8C and FIGS. 9A to 9C.

Figure 8A:
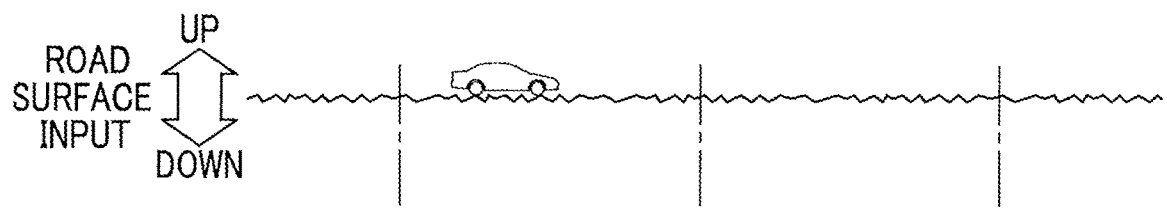
FIG. 8A is an explanatory diagram illustrating how the electromagnetic suspension apparatus according to the embodiment of the present invention works.
Figure 8B:
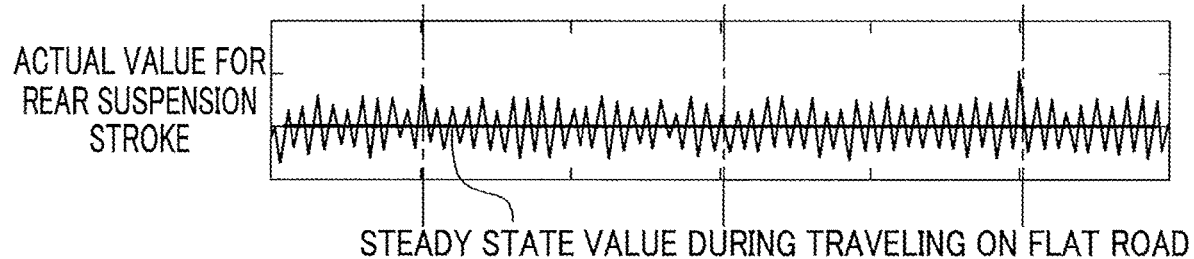
FIG. 8B is an explanatory diagram illustrating how the electromagnetic suspension apparatus according to the reference example works.
Figure 8C:
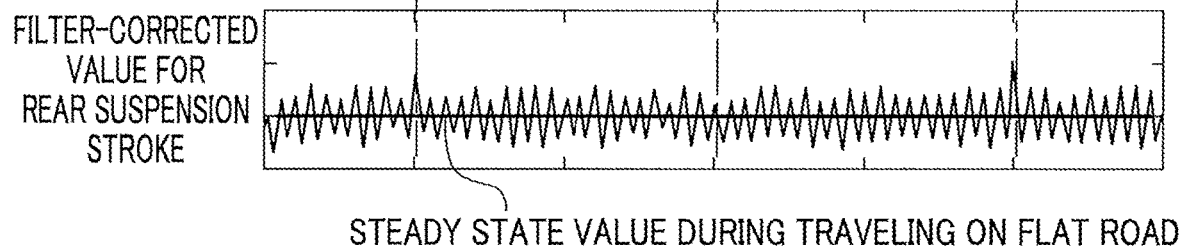
FIG. 8C is an explanatory diagram illustrating how the electromagnetic suspension apparatus according to the embodiment works.

FIG. 8A is an explanatory diagram illustrating how the electromagnetic suspension apparatus 11 according to the embodiment of the present invention works while the vehicle 10 carrying the apparatus is traveling on a flat road. FIG. 8B is an explanatory diagram illustrating how the electromagnetic suspension apparatus according to the reference example works. FIG. 8C is an explanatory diagram illustrating how the electromagnetic suspension apparatus 11 according to the embodiment works.

Figure 9A:
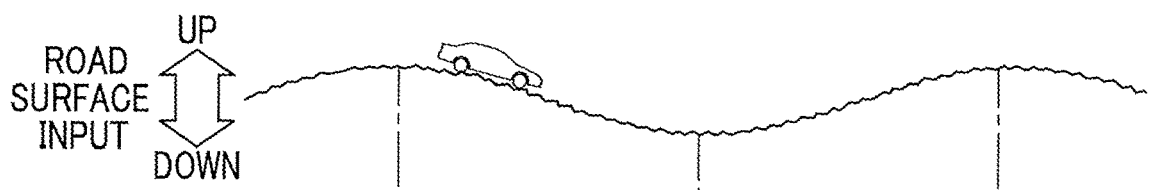
FIG. 9A is an explanatory diagram illustrating how the electromagnetic suspension apparatus according to the embodiment of the present invention works.
Figure 9B:
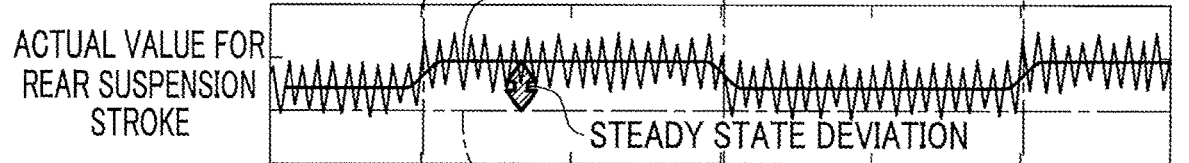
FIG. 9B is an explanatory diagram illustrating how the electromagnetic suspension apparatus according to the reference example works.
Figure 9C:
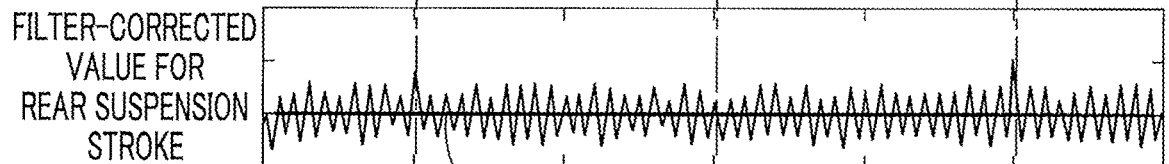
FIG. 9C is an explanatory diagram illustrating how the electromagnetic suspension apparatus according to the embodiment works.

FIG. 9A is an explanatory diagram illustrating how the electromagnetic suspension apparatus 11 according to the embodiment works while the vehicle 10 carrying the apparatus is traveling on an undulated road where each uphill road and each downhill road are connected alternately. FIG. 9B is an explanatory diagram illustrating how the electromagnetic suspension apparatus according to the reference example works. FIG. 9C is an explanatory diagram illustrating how the electromagnetic suspension apparatus 11 according to the embodiment works.

Now, it is assumed that as shown in FIG. 8A, the vehicle 10 carrying the electromagnetic suspension apparatus 11 according to the embodiment of the present invention is traveling on a flat road (with small roughness; the same applies to the following). At this time, sequential characteristics of the actual value for a rear suspension stroke (raw data on the rotation angle of each electric motor 31) are characterized by moment-by-moment fluctuations while the steady state value (prescribed constant value) during traveling on a flat road is set as a base as shown in FIG. 8B. The steady state value during traveling on a flat road corresponds to the neutral position of the stroke. Note that as shown in FIG. 8B, the electromagnetic suspension apparatus 11 according to the reference example and the electromagnetic suspension apparatus 11 according to the embodiment share the sequential characteristics of the actual value of the rear suspension stroke.

The time-series information about the actual value for the rear suspension stroke (raw data on the rotation angle of each electric motor 31) as shown in FIG. 8B is subjected to given high-pass filter processing. Then, FIG. 8C shows sequential characteristics of the filter-corrected value for the rear suspension stroke. The sequential characteristics (FIG. 8C) of the filter-corrected value for the rear suspension stroke and the sequential characteristics (FIG. 8B) of the actual value for the rear suspension stroke share the steady state value during traveling on a flat road and are thus substantially equivalent.

In short, as compared in FIGS. 8B and 8C, the electromagnetic suspension apparatus 11 according to the reference example and the electromagnetic suspension apparatus 11 according to the embodiment share the sequential characteristics of the value for the rear suspension stroke.

This is because the time-series information about the actual value for the rear suspension stroke fails to contain low-frequency components (e.g., caused by the considerably wavy road surface of the below-described undulated road), which frequency is less than the cut-off frequency fco of the high-pass filter 71.

Here, it is assumed that as shown in FIG. 9A, the vehicle 10 carrying the electromagnetic suspension apparatus 11 according to the embodiment of the present invention is traveling on an undulated road (with small roughness; the same applies to the following) where each uphill road and each downhill road are connected alternately. At this time, sequential characteristics of the actual value for a rear suspension stroke (raw data on the rotation angle of each electric motor 31) are characterized by moment-by-moment fluctuations while the steady state value (prescribed low-frequency variable) during traveling on an undulated road is set as a base as shown in FIG. 9B. As shown in FIG. 9B, the steady state value during traveling on an undulated road is increased by the steady state deviation represented by the prescribed low-frequency variable when compared to the steady state value (corresponding to the neutral position of the stroke) during traveling on a flat road. That is, during traveling on an undulated road, the stroke position relative to the neutral position of the stroke (the steady state value during traveling on a flat road) has a contraction-side offset by the steady state deviation.

FIG. 9B shows time-series information (of the electromagnetic suspension apparatus 11 according to the reference example) about the actual value for the rear suspension stroke (raw data on the rotation angle of each electric motor 31). Then, FIG. 9C shows sequential characteristics of the filter-corrected value for the rear suspension stroke after the given high-pass filter processing is performed. The sequential characteristics (FIG. 9C) of the filter-corrected value for the rear suspension stroke on an undulated road and the sequential characteristics (FIG. 8C) of the filter-corrected value for the rear suspension stroke on a flat road are substantially the same in view of sharing the stead state value during traveling on a flat road.

This is because the time-series information about the actual value for the rear suspension stroke on an undulated road originally contains low-frequency components (causing the steady state deviation), which frequency is less than the cut-off frequency fco of the high-pass filter 71, but these low-frequency components less than the cut-off frequency fco are removed by the high-pass filter processing.

Generally speaking, at most about 3 Hz or less is the upper limit of the stroke frequency involving low-frequency components (steady state deviation) caused by an undulated road (with small roughness) where each uphill road and each downhill road are connected alternately.

Then, a frequency value within a range from 0.5 to 3 Hz is suitably set for the cut-off frequency fco of the high-pass filter 71 such that the value for the steady state deviation represented by the low-frequency variable is decreased (including the case where the value for the steady state deviation is zero).

In this regard, the high-pass filter 71 exerts original high-pass filter processing function (steady state deviation-removing function) when the sequential characteristics of the stroke of the electromagnetic actuator 13 are under non-steady state conditions characterized in that the steady state deviation represented by the prescribed low-frequency variable is superimposed on the steady state value during traveling on a flat road.

In the electromagnetic suspension apparatus 11 according to the embodiment, the damping force map 61 is used to calculate a base value for damping force corresponding to the relative speed; meanwhile, the spring-controlling force map 63 is used to calculate a base value for spring-controlling force corresponding to the high-pass-filter-processed stroke position from which the steady state deviation has been removed; at the same time, the calculated base value for spring-controlling force is multiplied by the value of the first correction ratio for spring-controlling force corresponding to the likewise high-pass-filter-processed stroke position, from which the steady state deviation has been removed, so as to calculate a corrected value for spring-controlling force; and the target driving force obtained by integrating the above calculated base value for damping force and the corrected value for spring-controlling force is used to control driving of the electromagnetic actuator 13.

Here, the spring-controlling force calculation unit 53 according to the embodiment calculates each of the base value for spring-controlling force and the value of the first correction ratio for spring-controlling force by using the high-pass-filter-processed stroke position from which the steady state deviation has been removed. The calculated base value for spring-controlling force and value of the first correction ratio for spring-controlling force are each a value smaller, by the steady state deviation, than each value calculated using the stroke position based on the steady state deviation-containing time-series information, which has not been subjected to high-pass filter processing. This can prevent the behavior (attitude) of the vehicle 10 from becoming unstable and useless power consumption from occurring even if a situation where a steady load is imposed on the electromagnetic suspension apparatus 11 occurs.

In addition, when the stroke position is present in the neutral region CT1 including the neutral position, the spring-controlling force calculation unit 53 according to the embodiment calculates, as the correction value for spring-controlling force, a negative value, the absolute number of which is larger than that when the stroke position is present in the non-neutral region CT2 or CT3. This means that spring force of the mechanical spring member is weakened (the force applied to the spring member is made smaller). This enables ride comfort to improve.

The electromagnetic suspension apparatus 11 according to the embodiment of the present invention makes it possible to maintain good ride comfort regardless of the magnitude of spring constant preset for a spring member and regardless of whether a road slope is gradual or steep or a vehicle load weight is increased or decreased, whether a vehicle is accelerating or decelerating, or whether or not a vehicle is turning, etc.

[Advantageous Effects of Each Electromagnetic Suspension Apparatus 11 According to the Present Invention]

The following describes advantageous effects of each electromagnetic suspension apparatus 11 according to the present invention.

The first aspect provides an electromagnetic suspension apparatus 11 including: an electromagnetic actuator 13 provided in parallel with a spring member between a vehicle body and a wheel of a vehicle 10 and configured to generate driving force involving vibration damping of the vehicle body; an information acquisition unit 51 configured to acquire time-series information about a stroke position of the electromagnetic actuator 13; and an ECU (driving force control unit) 15 configured to calculate target driving force of the electromagnetic actuator 13 and use the calculated target driving force to execute driving force control of the electromagnetic actuator.

The information acquisition unit 51 acquires, as the time-series information about the stroke position of the electromagnetic actuator 13, high-pass-filter-processed time-series information obtained after, among the time-series information about the stroke position of the electromagnetic actuator 13, information belonging to a predetermined low-frequency zone (f<fco; see FIG. 6) is attenuated and information belonging to a higher-frequency zone than the low-frequency zone is passed as it is without attenuation.

The ECU (driving force control unit) 15 corrects the target driving force such that when the stroke position of the electromagnetic actuator 13 on the basis of the high-pass-filter-processed time-series information, from which the low-frequency components (steady state deviation) have been removed, acquired by the information acquisition unit 51 is present in the neutral region CT1 including the neutral position, spring force of the spring member is made weaker than when the stroke position is present in the non-neutral region CT2 or CT3.

According to the electromagnetic suspension apparatus 11 based on the first aspect, the ECU (driving force control unit) 15 corrects the target driving force such that when the stroke position of the electromagnetic actuator 13 on the basis of the high-pass-filter processed time-series information, from which the low-frequency components (steady state deviation) have been removed, is present in the neutral region CT1 including the neutral position, spring force of the spring member is made weaker than when the stroke position is present in the non-neutral region CT2 or CT3. This makes it possible to maintain good ride comfort regardless of the magnitude of spring constant preset for a spring member and regardless of whether a road slope is gradual or steep or a vehicle load weight is increased or decreased, whether a vehicle is accelerating or decelerating, or whether or not a vehicle is turning, etc.

In addition, the second aspect provides an electromagnetic suspension apparatus 11 including: an electromagnetic actuator 13 provided in parallel with a spring member between a vehicle body and a wheel of a vehicle 10 and configured to generate driving force involving vibration damping of the vehicle body; an information acquisition unit 51 configured to acquire time-series information about a stroke position of the electromagnetic actuator 13; a spring-controlling force calculation unit 53 configured to calculate, based on the stroke position acquired by the information acquisition unit 51, spring-controlling force to be generated in the electromagnetic actuator 13; a relative speed-correlated value calculation unit (information acquiring unit 51) configured to calculate a value correlated to a relative speed (in contraction direction/expansion direction) between a sprung member and an unsprung member of an spring member in a vehicle body; and an ECU (driving force control unit) 15 configured to calculate, based on the relative speed-correlated value calculated (acquired) by the information acquiring unit 51 and the spring-controlling force calculated by the spring-controlling force calculation unit 53, target driving force of the electromagnetic actuator 13 and use the calculated target driving force to execute driving force control of the electromagnetic actuator.

The information acquisition unit 51 includes a high-pass filter 71 configured to output time-series information obtained after time-series information about the stroke position of the electromagnetic actuator 13 is input and among the input time-series information, information belonging to a low-frequency zone having a predetermined cut-off frequency fco as a threshold (f<fco; see FIG. 6) is attenuated and information belonging to a higher-frequency zone than the low-frequency zone is passed as it is without attenuation, the information acquisition unit configured such that the high-pass-filter 71-processed time-series information is acquired as the time-series information about the stroke position of the electromagnetic actuator 13.

The ECU (driving force control unit) 15 corrects the target driving force such that when the stroke position of the electromagnetic actuator 13 on the basis of the high-pass-filter-processed time-series information, from which the low-frequency components (steady state deviation) have been removed, acquired by the information acquisition unit 51 is present in the neutral region CT1 including the neutral position, spring force of the spring member is made weaker than when the stroke position is present in the non-neutral region CT2 or CT3.

According to the electromagnetic suspension apparatus 11 based on the second aspect, like the electromagnetic suspension apparatus 11 based on the first aspect, the ECU (driving force control unit) 15 corrects the target driving force such that when the stroke position of the electromagnetic actuator 13 on the basis of the high-pass-filter processed time-series information, from which the low-frequency components (steady state deviation) have been removed, is present in the neutral region CT1 including the neutral position, spring force of the spring member is made weaker than when the stroke position is present in the non-neutral region CT2 or CT3. This makes it possible to maintain good ride comfort regardless of the magnitude of spring constant preset for a spring member and regardless of whether a road slope is gradual or steep or a vehicle load weight is increased or decreased, whether a vehicle is accelerating or decelerating, or whether or not a vehicle is turning, etc.

Generally speaking, at most about 3 Hz or less is the stroke frequency involving low-frequency components (steady state deviation) caused by an undulated road (with small roughness) where each uphill road and each downhill road are connected alternately.

Then, the electromagnetic suspension apparatus 11 based on the third aspect is the electromagnetic suspension apparatus 11 based on the first or second aspect, wherein a frequency value within a range from 0.5 to 3 Hz is set to the cut-off frequency fco of the high-pass filter 71.

According to the electromagnetic suspension apparatus 11 based on the third aspect, the cut-off frequency fco of the high-pass filter 71 is set to a frequency value within a range from 0.5 to 3 Hz, which is suitable for removing the low-frequency components (steady state deviation) caused by an undulated road (with small roughness) where each uphill road and each downhill road is connected alternately.

This can further enhance the effects of maintaining good ride comfort by making the high-pass filter processing function (steady state deviation-removing function) sufficiently effective.

Other Embodiments

The above-described embodiments are examples to be embodied in the present invention. Accordingly, they should not be construed such that the technical scope of the present invention is limited. This is because the present invention can be put into practice, without departing from the spirit and the main features thereof, even in various embodiments.

For instance, the electromagnetic suspension apparatus 11 of the present invention is illustrated by referring to an embodiment in which the total of four electromagnetic actuators 13 provided at front wheels (a left front wheel and a right front wheel) and rear wheels (a left rear wheel and a right rear wheel) are arranged. However, the present invention is not limited to this embodiment. It may be possible to adopt a configuration where the total of two electromagnetic actuators 13 are arranged at either front wheels or rear wheels.

Last, to describe the embodiment of the present invention, the drive control unit 57 configured to independently control driving of each of the plurality of electromagnetic actuators 13 has been mentioned.

Specifically, however, the drive control unit 57 may independently control, per wheel, the driving of the electromagnetic actuator 13 of each of the four wheels.

Alternatively, the driving of the electromagnetic actuators 13 provided at four wheels may be controlled such that front-wheel-side ones or rear-wheel-side ones are controlled independently; or left-wheel-side ones or right-wheel-side ones are controlled independently.

REFERENCE SIGNS LIST

10 Vehicle
11 Electromagnetic suspension apparatus according to a reference example or embodiment of the present invention
13 Electromagnetic actuator
15 ECU (Driving force control unit)
51 Information acquisition unit
53 Spring-controlling force calculation unit
55 Driving force calculation unit
57 Drive control unit
71 High-pass filter

The invention claimed is:

1. An electromagnetic suspension apparatus comprising:
an electromagnetic actuator provided in parallel with a spring member between a vehicle body and a wheel of a vehicle and configured to generate driving force involving vibration damping of the vehicle body; and
an electronic control unit (ECU) that is a microcomputer configured to control driving the electromagnetic actuator, the ECU comprising:
an information acquisition unit configured to acquire time-series information about a stroke position of the electromagnetic actuator;
a spring-controlling force calculation unit configured to receive the time-series information about the stroke position of the electromagnetic actuator from the information acquisition unit, set a first correction ratio value by referring to a first correction ratio map, calculate a base value for spring-controlling force by referring to a spring-controlling force map, and multiply the value of the first correction ratio by the base value for spring-controlling force to calculate a spring-controlling force value;
a driving force calculation unit configured to calculate a base value for a damping force corresponding to a relative speed between a sprung member and an unsprung member of the spring member in the vehicle body by referring to a damping force map, receive the spring-controlling force value from the spring-controlling force calculation unit, and add the spring-controlling force value to the base value for the damping force to generate a driving force-controlling signal; and
a driving force control unit configured to receive the driving force-controlling signal from the driving force calculation unit, calculate target driving force of the electromagnetic actuator, and use the calculated target driving force to execute driving force control of the electromagnetic actuator,
wherein the information acquisition unit acquires, as the time-series information about the stroke position of the electromagnetic actuator, processed time-series information obtained after, among the time-series information about the stroke position of the electromagnetic actuator, information belonging to a predetermined low-frequency zone is attenuated and information belonging to a higher-frequency zone than the low-frequency zone is passed; and
the driving force control unit corrects the target driving force such that when the stroke position of the electromagnetic actuator on a basis of the processed time-series information acquired by the information acquisition unit is present in a neutral region including a neutral position that is an origin between a contraction-side end region and an expansion-side end region with respect to the spring member, a force from the electromagnetic actuator applied to the spring member is made weaker than when the stroke position is present in a non-neutral region.

2. The electromagnetic suspension apparatus according to claim 1, wherein the spring-controlling force calculation unit includes a multiplier configured to calculate the spring-controlling force value by multiplying the base value for spring-controlling force with the value of the first correction ratio, and send the calculated spring-controlling force value to the driving force calculation unit.

3. The electromagnetic suspension apparatus according to claim 1, wherein the driving force calculation unit includes an adder configured to generate driving force-controlling signals based on the target driving force by adding the corrected value for spring-controlling force to the base value for damping force corresponding to the relative speed.

4. The electromagnetic suspension apparatus according to claim 1, wherein when the stroke position is present in one of an intermediate region between the expansion-side end region and the neutral region, and an intermediate region between the contraction-side end region and the neutral region, the value of the first correction ratio in the first correction ratio map increases as the stroke position is located closer to one of the expansion-side end and the contraction-side end relative to the neutral position.

5. The electromagnetic suspension apparatus according to claim 4, wherein the value of the first correction ratio increases linearly in an expansion direction along the intermediate region between the neutral region to the expansion-end region, and the value of the first correction ratio increases linearly in a contraction direction along the intermediate region between the neutral region to the contraction-end region.

6. The electromagnetic suspension apparatus according to claim 1, wherein the expansion-side end region includes an expansion-side end, the contraction side-end region includes a contraction side end, and when the stroke position is present in one of the expansion-side end region and the contraction-side end region, the value of the first correction ratio is set to a fixed value.

7. An electromagnetic suspension apparatus comprising:
an electromagnetic actuator provided in parallel with a spring member between a vehicle body and a wheel of a vehicle and configured to generate driving force involving vibration damping of the vehicle body; and
an electronic control unit (ECU) that is a microcomputer configured to control driving the electromagnetic actuator, the ECU comprising:
an information acquisition unit configured to acquire time-series information about a stroke position of the electromagnetic actuator;
a spring-controlling force calculation unit configured to calculate, based on the stroke position acquired by the information acquisition unit, spring-controlling force to be generated in the electromagnetic actuator;
a relative speed-correlated value calculation unit configured to calculate a value correlated to a relative speed between a sprung member and an unsprung member of the spring member in the vehicle body; and
a driving force control unit configured to calculate, based on the relative speed-correlated vale calculated by the relative speed-correlated value calculation unit and the spring-controlling force calculated by the spring-controlling force calculation unit, target driving force of the electromagnetic actuator and use the calculated target driving force to execute driving force control of the electromagnetic actuator,
wherein the information acquisition unit includes a high-pass filter configured to output time-series information obtained after time-series information about the stroke position of the electromagnetic actuator is input and among the input time-series information, information belonging to a low-frequency zone having a predetermined cut-off frequency as a threshold is attenuated and information belonging to a higher-frequency zone than the low-frequency zone is passed, the information acquisition unit configured such that the high-pass-filter-processed time-series information is acquired as the time-series information about the stroke position of the electromagnetic actuator; and
the driving force control unit corrects the target driving force such that when the stroke position of the electromagnetic actuator on a basis of the processed time-series information acquired by the information acquisition unit is present in a neutral region including a neutral position that is an origin between a contraction-side end region and an expansion-side end region with respect to the spring member, a force from the electromagnetic actuator applied to the spring member is made weaker than when the stroke position is present in a non-neutral region.

8. The electromagnetic suspension apparatus according to claim 7, wherein a frequency value within a range from 0.5 to 3 Hz is set to the cut-off frequency of the high-pass filter.

* * * * *